(12) United States Patent
Denzler

(10) Patent No.: US 9,447,565 B2
(45) Date of Patent: *Sep. 20, 2016

(54) SANITARY COMPONENT, NAMELY JET REGULATOR OR JET FORMER FOR FLOWING, FLUID MEDIA, METHOD OF PRODUCING SUCH A SANITARY COMPONENT AND USE OF A SANITARY COMPONENT

(75) Inventor: Oliver Denzler, Bottmingen (CH)

(73) Assignee: NEOPERL GmbH, Müllheim (DE)

( * ) Notice: Subject to any disclaimer, the term of this patent is extended or adjusted under 35 U.S.C. 154(b) by 552 days.

This patent is subject to a terminal disclaimer.

(21) Appl. No.: 13/612,104

(22) Filed: Sep. 12, 2012

(65) Prior Publication Data

US 2013/0074968 A1   Mar. 28, 2013

Related U.S. Application Data

(63) Continuation of application No. 11/920,592, filed as application No. PCT/EP2005/006756 on Jun. 22, 2005, now Pat. No. 8,925,831.

(30) Foreign Application Priority Data

May 18, 2005 (DE) .......................... 10 2005 022 841

(51) Int. Cl.
*E03C 1/08* (2006.01)
*E03C 1/04* (2006.01)
*F16L 55/027* (2006.01)

(52) U.S. Cl.
CPC . *E03C 1/04* (2013.01); *E03C 1/08* (2013.01); *F16L 55/02709* (2013.01); *Y10T 137/0402* (2015.04); *Y10T 137/794* (2015.04)

(58) Field of Classification Search
CPC .... E03C 1/08; E03C 2001/082; E03C 1/084; E03C 1/086; Y10T 137/0402; Y10T 137/0318; Y10T 137/794; F16L 55/02709; F16L 55/02; F16L 55/027

USPC .......................... 239/71, 74, 428.5
See application file for complete search history.

(56) References Cited

U.S. PATENT DOCUMENTS 5,253,807 A * 10/1993 Newbegin ........................ 239/11
5,769,326 A    6/1998 Muchenberger et al. . 239/428.5

(Continued)

FOREIGN PATENT DOCUMENTS

DE        20010101      8/2000    ............... E03C 1/08
EP         1308563      5/2003    ............... E03B 7/09

(Continued)

OTHER PUBLICATIONS

International Preliminary Report on Patentability and the Written Opinion of the International Searching Authority, dated Dec. 6, 2007, and the International Search Report dated Oct. 5, 2005, issued by WIPO for corresponding PCT No. PCT/EP2005/006756 (in English).

*Primary Examiner* — Christopher Kim
(74) *Attorney, Agent, or Firm* — Gerald T. Bodner

(57) ABSTRACT

The invention relates to a sanitary component, namely a stream regulator or stream former for flowing fluid media, consisting of property-defining components in a sandwich-like arrangement in the direction of flow which comprise at least one screen attachment, one diffuser plate assembly as well as a shell body having segments of stream-forming openings extending across its cross-sectional surface. The property-defining components are exchangeable and combinable so as to realize adaptability to different user and user requirements. A locking means is provided e.g. on the inner circumference of the shell body for this purpose as is a corresponding counter-locking means on the outer circumference of the diffuser plate assembly. The diffuser plate assembly exhibits, at least on its exterior, a flow rate class-specifying optical code and the shell body exhibits a stream type-specifying, namely laminar or aerated, optical code.

18 Claims, 9 Drawing Sheets

(56) References Cited

U.S. PATENT DOCUMENTS

Figure 1:
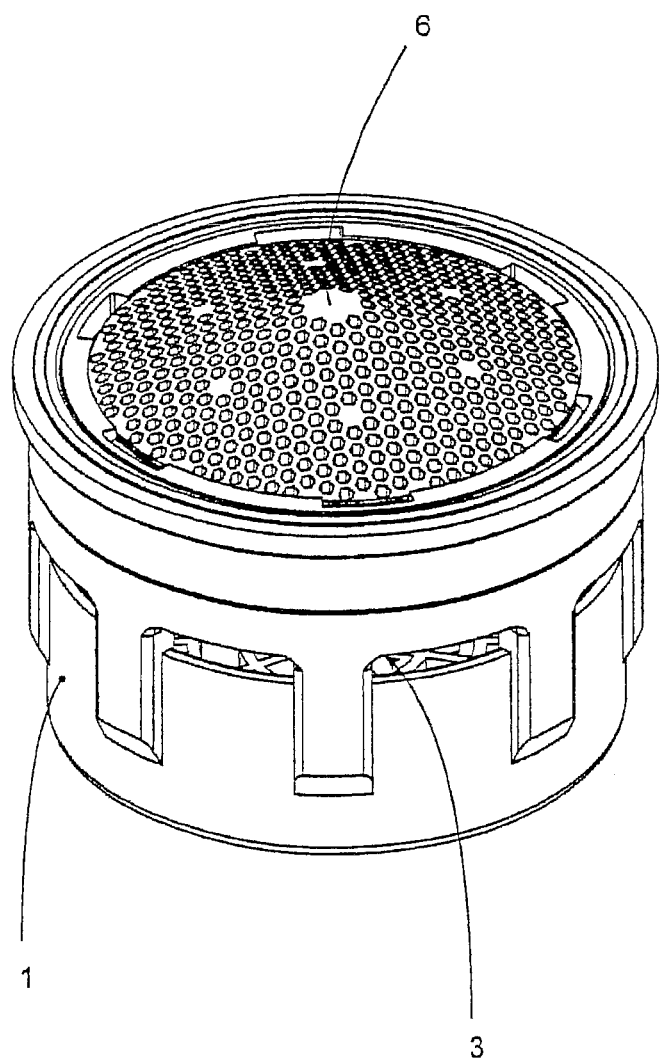

| | | | |
|---|---|---|---|
| 5,868,316 A | 2/1999 | Scott | 239/73 |
| 6,409,100 B1 | 6/2002 | Lundberg | 239/428.5 |
| 6,513,731 B2 | 2/2003 | Griffin et al. | 239/394 |
| 6,902,123 B2 | 6/2005 | Grether et al. | 239/428.5 |
| 7,217,362 B2 | 5/2007 | Hsiao | 210/232 |
| 7,731,107 B2 | 6/2010 | Grether | 239/500 |
| 7,871,023 B2 | 1/2011 | Grether | 239/600 |
| 8,925,831 B2 * | 1/2015 | Denzler | 239/8 |
| 2003/0197072 A1 | 10/2003 | Flieger | 239/428.5 |

FOREIGN PATENT DOCUMENTS

| | | | |
|---|---|---|---|
| WO | WO 97/32244 | 9/1997 | G05D 7/01 |
| WO | WO 2004/033108 | 4/2004 | B05B 1/18 |

* cited by examiner

Table 1

Restricted flow

| Screen attachment | Diffuser/Restrictor | Function: Flow rate |
|---|---|---|
| dark green | dark green | T  5.7 l/min at 4.2 bar |
| burgundy | burgundy | X  8.3 l/min at 4.2 bar |
| light green | light green | Z  9.0 l/min at 3 bar |
| light blue | light blue | A  15.0 l/min at 3 bar |
| yellow | yellow | S  19.8 l/min at 3 bar |
| dark blue | dark blue | B  25.2 l/min at 3 bar |
| dark gray | dark gray | C  30.0 l/min at 3 bar |
| light gray | light gray | D  37.8 l/min at 3 bar |
| gray | gray | M  65.0 l/min at 3 bar |
| orange | orange | G  > 65.0 l/min at 3 bar |
| blue | neutral | V  21.0 l/min at 3 bar |
| ivory | neutral | 3.8 l/min at 4.2 bar (1.0 gpm at 60 psi) |
| green | neutral | 5.7 l/min at 4.2 bar (1.5 gpm at 60 psi) |
| brown | neutral | 6.6 l/min at 4.2 bar (1.75 gpm at 60 psi) |
| olive | neutral | 7.6 l/min at 4.2 bar (2.0 gpm at 60 psi) |
| red | neutral | 8.3 l/min at 4.2 bar (2.2 gpm at 60 psi) |
| beige | neutral | 11.4 l/min at 4.2 bar (3.0 gpm at 60 psi) |
| black | neutral | 13.2 l/min at 4.2 bar (3.5 gpm at 60 psi) |
| pink | neutral | 15.1 l/min at 4.2 bar (4.0 gpm at 60 psi) |
| purple | neutral | 17.0 l/min at 4.2 bar (4.5 gpm at 60 psi) |
| white | neutral | max. flow, > 35 l/min at 3 bar |

FIG. 6

Table 2

Regulated flow

| Screen attachment | Flow regulator | Function: Regulated flow |
|---|---|---|
| transparent | light green | 1.7 l/min (max. 0.5 gpm) |
| transparent | dark green | 2.0 l/min |
| transparent | green | 2.5 l/min |
| transparent | purple | 3.0 l/min |
| transparent | dark blue | 3.5 l/min (max. 1.0 gpm) |
| transparent | pink | 4.0 l/min |
| transparent | orange | 5.0 l/min (max. 1.5 gpm) |
| transparent | black | 6.0 l/min (max. 1.75 gpm) |
| transparent | yellow | 8.3 l/min (max. 2.2 gpm) |
| transparent | white | 8.0 l/min |

FIG. 7

Table 3

Stream type

| Shell | Function: Stream type |
|---|---|
| dark gray | aerated |
| light gray | laminar |

FIG. 8

Table 4

Predefined retail colors (EU)

| Screen attachment | Function |
|---|---|
| green shade | water-economizing |
| blue shade | standard flow |
| gray shade | full flow |

FIG. 9

Table 5

Predefined retail colors (US)

| Screen attachment | Function |
|---|---|
| green shade | water-economizing |
| red shade | standard flow |
| gray shade | full flow |

FIG. 10

Table 6

Noise coding

| Diffuser ring | Function: Noise |
|---|---|
| neutral | non-noise-reducing |
| colored | noise-reducing |

FIG. 11

Table 7

Haptics

| Haptics | Function: Lime resistance |
|---|---|
| fluted screen structure (non-rigid surface) | standard |
| hard (rigid) synthetic material structure | anti-lime function |
| soft elastomer structure (selective non-rigid points) | active anti-lime function |

FIG. 12

Table 8

Mobility

| Shell base | Stream direction |
|---|---|
| white | pivotable |
| dark gray | fixed, in axial direction |
| light gray | fixed, in axial direction |

FIG. 13

SANITARY COMPONENT, NAMELY JET REGULATOR OR JET FORMER FOR FLOWING, FLUID MEDIA, METHOD OF PRODUCING SUCH A SANITARY COMPONENT AND USE OF A SANITARY COMPONENT

CROSS-REFERENCE TO RELATED APPLICATIONS

This application is a continuation of co-pending U.S. application Ser. No. 11/920,592, filed on Nov. 15, 2007, and entitled, "Sanitary Component, Namely Jet Regulator Or Jet Former For Flowing, Fluid Media, Method Of Producing Such A Sanitary Component And Use Of A Sanitary Component", which is based on PCT Application Serial No. PCT/EP2005/006756, filed on Jun. 22, 2005, and which in turn claims priority to German Application Serial No. 10 2005 022 841.0, filed on May 18, 2005, the disclosure of each of which is incorporated herein by reference and on which priority is hereby claimed.

DESCRIPTION

The invention relates to a sanitary component, namely a stream regulator or stream former for flowing fluid media, consisting of property-defining components in a sandwich-like arrangement in the direction of flow, a method of manufacturing such a sanitary component, as well as the use of such sanitary components, namely stream regulators or stream formers.

Stream regulators or stream formers marketed by the Neoperl GmbH company under the brand names "Neoperl®" and "Perlator®" have been part of the prior art for years.

At the same time, due to different standards, e.g. the European EN 246 standard or the US ASME A112.18.1M standard, there needs to be a number of different products available reflecting different flow rates or different flow rate restrictions. Also, different stream patterns are sought such as, on the one hand, those mixed with air as so-called bubbly flows and, on the other, laminar, crystal-clear flows of fluid media, while it is just as desirous to have control over the noise emissions occurring in outflowing streams. The above requirements further increase the number of different products which actually serve one and the same purpose.

The most essential components for stream regulators or stream formers for flowing fluid media comprise means arranged in sandwich-like manner in the direction of flow; i.e., customarily a circular screen attachment, a circular diffuser plate assembly as well as a substantially cylindrical shell body having segments with stream-forming openings extending across its cross-sectional surface which can be configured in one piece with the shell and/or as insert plates.

The screen attachments or filter screens, stream regulators, flow rate regulators, flow restrictors and/or check valves upstream the direction of flow protect the sanitary insert elements from dirt particles carried along in the water. The screen attachments are usually connected to the other structural components and are inserted as one associated functional unit in an outflow nozzle attached to the water outlet of a faucet with e.g. screws or are inserted directly into the faucet. Screen attachments are typically made from a nontransparent synthetic material which obstructs the view of the insert elements disposed at the outflow side. As such, the user thus cannot readily tell which additional stream-forming or flow rate restricting means are provided inside the stream regulator.

Since, as noted above, the spectrum of stream regulator or stream former variants span different flow rate classes, whereby only 6 l/min at 3 bar is required to operate a hand washbasin faucet, for example, while 30 l/min at 3 bar is recommended for filling a bathtub, and as also noted above, there are different technologies for producing the flow rate classes as well as producing laminar, crystal-clear or aerated streams, the user of commercially-available stream regulators, especially when dealing with spare parts, is often not able to tell which stream regulator needs to be inserted into the existing faucet so that it will operate trouble-free and comply with the necessary comfort and safety requirements.

Moreover, since even for a large multitude of final products, the number of function-defining components should be kept as low as possible for technical manufacturing and cost-cutting reasons, and ultimately to also keep stock to a minimum, attempts have already been made to provide the entire necessary array of products using a combination of just a few components or component units. However, a manufacturing process also has to ensure, subject to quality assurance, that only those components are in fact used which, as a whole, ensure the desired parameters of the stream regulator the customer will ultimately use.

A further difficulty in the prior art with regard to identifying suitable stream regulators relates to the fact that due to faucets normally being standardized, it is not possible to realize type-relevant or application-specific measures with e.g. a particular external design. This is compounded by the fact that stream regulators are frequently sold as OEM products, whereby there are only specifications from the particular faucet manufacturer, both with respect to the stream regulator itself as well as the typically metallic outer housing which accommodates the stream regulator in its interior and which is connected to the outlet faucet, not, however, specifications on the specific properties of the particular stream regulator. In other words, there is a relatively high risk of confusion relative the prior art, particularly when the products are sold without an outer housing for spare part needs.

Based on the above, the task the invention therefore addresses is that of further developing a sanitary component, namely a stream regulator or a stream former for flowing fluid media, which can be clearly identified both in the manufacturing process as well as in subsequent use by various different design and technological measures and whereby it is possible to realize the manufacture of such components in an effective, cost-efficient and simple manner without compromising the quality standards respective the final product.

A further task of the invention is the developing of a method for manufacturing such sanitary components, namely stream regulators or stream formers, which is conducive to an automated assembly of stream regulators or stream formers.

Last but not least, it should be possible to use such sanitary components, namely stream regulators or stream formers, in such a manner that use of unsuitable components can be excluded with a probability bordering on certainty, e.g. a flow rate class for filling a bathtub used with a faucet for a hand washbasin. The same applies to the case, as should be avoided, of OEM customers using unsuitable components.

The solution to this task of the invention is realized with a sanitary component in accordance with the features of claim 1, a method for manufacturing such a sanitary component in accordance with the definition of claim 20, as well as the specific use of sanitary components according to the teaching of claim 22, whereby the subclaims constitute no less than functional designs and embodiments.

The sanitary component according to the invention, namely in the form of a stream regulator or stream former for flowing fluid media, consists of property-defining components in a sandwich-like or stacked arrangement.

These components comprise at least one preferably circular screen attachment or filter screen, one preferably circular or circular-cylindrical diffuser plate assembly as well as a preferably cylindrical shell body having segments with stream-straightening or stream-forming openings extending across its cross-sectional surface.

To realize an adaptability to the most diverse user and use requirements, said property-defining components are exchangeable and combinable. To this end, locking means are for example arranged on the inner circumference of the shell body and corresponding counter-locking means are arranged for example on the outer circumference of the circular diffuser plate assembly. These means are preferably formed integrally; i.e. as one piece with the respective component.

The preferably circular or circular-cylindrical diffuser plate assembly exhibits a coding specifying the flow rate class, at least on its exterior, and the shell body exhibits a coding defining the flow type or the stream pattern respectively. The flow type or stream pattern is preferably laminar with a crystal-clear stream or bubbly; i.e. aerated. The flow type or stream pattern is symbolized by a specifying optical coding.

In a further embodiment of the inventive stream regulator, the outflow area of the shell body comprises a pivotable insert or pivotable stream straightener provided with stream-forming means.

With the circular embodiment of the diffuser plate assembly and the shell body, the inside of the shell body is configured in the shape of a spherical cap and the pivotable stream straightener likewise has a complementary spherical cap shape. The pivotable stream straightener allows the outflow stream to be titled or swiveled at a specific angle from the longitudinal axis of the stream regulator. Moving the straightener in terms of the desired pivoting can be realized without any auxiliary means; i.e. by simply pressing a finger lightly on the underside of the plate.

The type of given stream regulator design, with or without a pivotable stream by means of a movable stream straightener, can be symbolized by a further optical coding.

In a modified embodiment of an inventive stream regulator, a coating of a defined minimum thickness or minimum strength made of an elastomer material, e.g. silicone, is provided on the outer surface of the flow straightener, which can also be formed integrally with the shell body. This coating thereby follows the contour or structure of the straightener in the direction of flow. The especially calciferous deposits which adhere to the elastomer coating over the serviceable life of the stream regulator can be removed very easily by gently moving; i.e. rubbing the coating.

The type of coating on the exterior of the flow straightener moreover allows another haptic; i.e. tactile coding in the sense of the inventive task.

Finally, stream regulators are known which are not accommodated within a metallic outer sleeve but rather screwed directly into the e.g. tubular end of an outflow faucet. Such concealed stream regulators comprise a shell body with a male thread and a washer which is usually disposed in a circumferential groove. Said washer can have an optical; i.e. color coding differing from the color coding of the shell body. This coding then symbolizes e.g. the type of male thread, the thread pitch or the like.

In one embodiment, the screen attachment is inserted into a circumferential inner recess of the circular diffuser plate assembly, preferably by means of a locking or snap-in connection, whereby in the case of a flow regulator disposed between the screen attachment and the diffuser plate assembly, the screen attachment is designed to be translucent or transparent and the flow regulator has another optical coding.

In the case where no flow regulator is provided, the optical coding of the screen attachment is designed to match that of the diffuser plate assembly or be provided in a predefined combination.

In a particularly preferred embodiment of the teaching of the invention, the optical codings are designed as respectively different color codings.

The color gradings or color differences to the respective codings relate to color temperatures which can be detected by means of optoelectronic image detection and analysis. It is also within the sense of the invention for the color gradings to be readily perceived by the human eye.

The color codes for the screen attachment comprise 21 colors, namely dark green, burgundy, light green, light blue, yellow, dark blue, dark gray, light gray, gray, orange, blue, ivory, green, brown, olive, red, beige, black, pink, purple and white.

The color codes for the flow regulator comprise ten colors, preferably namely light green, dark gray, green, purple, dark blue, pink, orange, black, yellow and white.

The color codes for the diffuser plate assembly comprise at least eleven colors, namely dark green, burgundy, light green, light blue, yellow, dark blue, dark gray, light gray, gray, orange and neutral. The neutral shade is to be understood as a color ensuing from the preferably synthetic material used, along with its material properties, without the addition of any color. When using the preferable POM material, this results in a shade which is opaque to milky white.

The diffuser plate assembly is typically inserted into the shell body, but can also be configured as, for example, a component having an annular outer contour differing from the color of the shell body. A neutral color to the diffuser plate assembly then symbolizes a non-noise-reducing model while a colored variant symbolizes a noise-reducing model (see Table 6, FIG. 11).

The color coding to the shell body comprises at least two colors, whereby a first color is associated with a shell body having air supply slots and a second color is associated with a shell body without air supply slots.

The first color is preferably dark gray while the second color is preferably light gray, whereby each shell body is of a solid-colored synthetic material.

A complementary color code for the shell body or the base of the shell body, namely with a colored marking clearly differing from the afore-mentioned two colors, applies to an embodiment in which the flow straightener is configured as a pivotable insert for the shell body. For example, the color white symbolizes a pivotable embodiment while the dark gray or light gray colors symbolize a fixed embodiment.

The flow regulator used in the respective sanitary component comprises a control gap, the flow cross-section of which can be altered by means of an elastically deformable ring under the pressure of the flowing fluid medium.

The transparency to the screen attachment is selected such that the position of the deformable ring is or remains identifiable on the one hand and, on the other, the entire flow regulator including its coding is visible.

In one embodiment of the invention, the elastic ring can likewise exhibit a visually identifiable coding, in particular a color coding, which differs from the control gap or its surrounding area.

The screen attachment is configured to have a convex or conical shape at the inflow side.

The screen attachment preferably exhibits polygonal screen openings and has an annular collar which locks into place in the inner recess of the circular diffuser plate assembly. The basic tint to the screen attachment can moreover provide a simple, easily-grasped indication of the preferred specific application, e.g. "water-saving," "maximum flow," or "normal use."

As set forth above, subject to the use-specific requirements, a selection can be made from among different diffuser plate assemblies and shell bodies, as well as flow regulators where applicable, whereby these components can be easily assembled using for example locking means or snap-in connections. Although there are only a small number of individual components visible in the assembled state, this proposed type of optical coding provides the opportunity to make a visual determination just by a quick identification of the corresponding matching pattern or colored depiction; i.e. without any other aid, as to whether the given product will correspond to the expected requirements and/or whether it will be suitable for its intended use.

With respect to the method of manufacturing a sanitary component, namely a stream regulator or stream former for flowing fluid media, the sandwich-like arrangement of the property-defining components in the direction of flow is again in turn assumed, whereby same includes at least one e.g. circular screen attachment, one e.g. circular diffuser plate assembly as well as an e.g. cylindrical shell body having segments of stream-forming, stream-straightening openings extending across its cross-sectional surface.

These property-defining components are exchangeable and combinable so as to realize adaptability to different user and use requirements. To this end, specific locking means or connections which are integrally formed on or inserted into the corresponding components are preferably employed.

The e.g. circular diffuser plate assembly exhibits an optical coding specifying its flow rate class, at least on its exterior, and the shell body exhibits an optical coding specifying flow type; i.e. laminar or aerated.

The screen attachment can be inserted into the diffuser plate assembly, preferably by means of the afore-mentioned locking connection, whereby in the case of a flow regulator inserted between the screen attachment and the diffuser plate assembly, the screen attachment is of a translucent or transparent configuration.

The flow regulator likewise exhibits a specifying optical coding. When no flow regulator is provided, the optical coding to the screen attachment matches that of the diffuser plate assembly or is provided in a predefined combination, particularly color combination.

Based on customer-specific requirements as to the flow rate class and respective stream pattern and/or flow rate desired, the method's coding of the property-defining components is gleaned from a code table to match or approximate the customer-specific requirements to the greatest extent possible.

This information facilitates the retrieval of the components from inventory as well as their assembly, and also allows for automating and control. Optoelectronic image acquisition and digital image processing methods are particularly well-suited for such control purposes.

The use or application of sanitary components pursuant the invention, in particular as defined in claim 1, is realized drawing on a manufacturer-authorized code table which indicates which specific optical coding as identifiable on the components without disassembly corresponds to, or approximates to the greatest extent possible, the respective application in terms of stream pattern, flow rate restriction and/or flow rate class.

It is noted at this point that realizing the teaching according to the invention not only can optimize the manufacturing process and improve quality assurance, but also allows the end user to readily identify the respective replacement model, ultimately with the consequence of simplifying the preparing of orders and the actual purchase.

The following will draw on the example of an embodiment as well as refer to figures and tables in specifying the invention in greater detail.

Figure 2A:
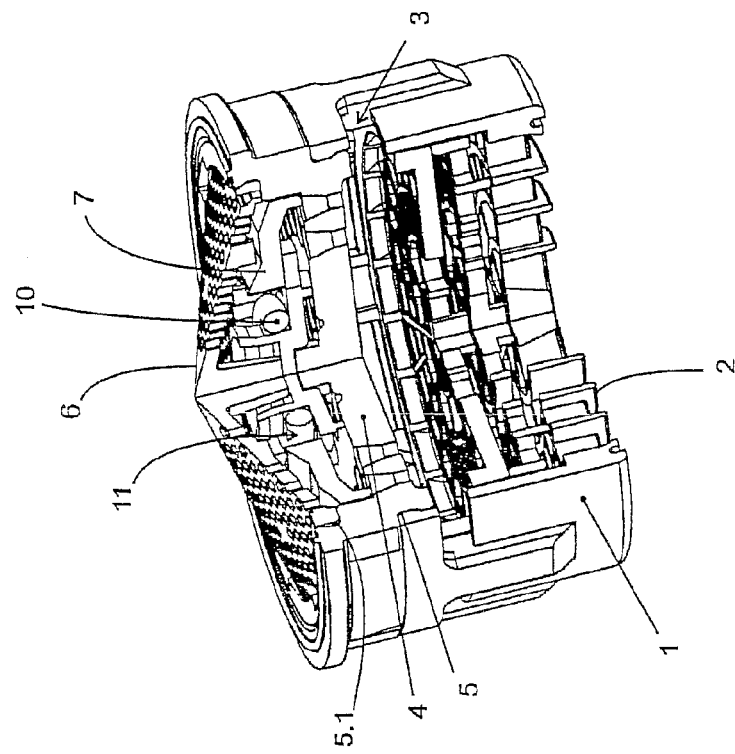
Figure 1A:
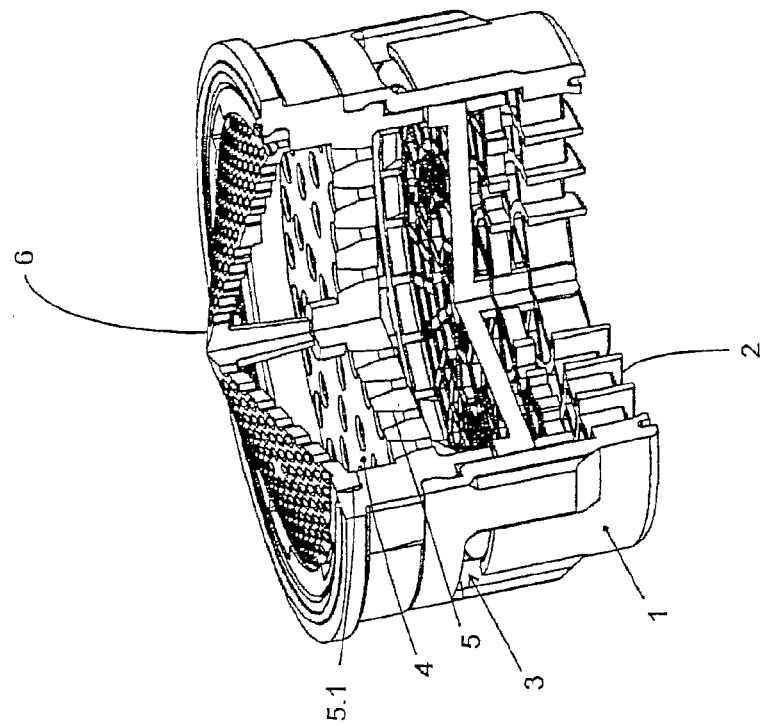
Figure 2:
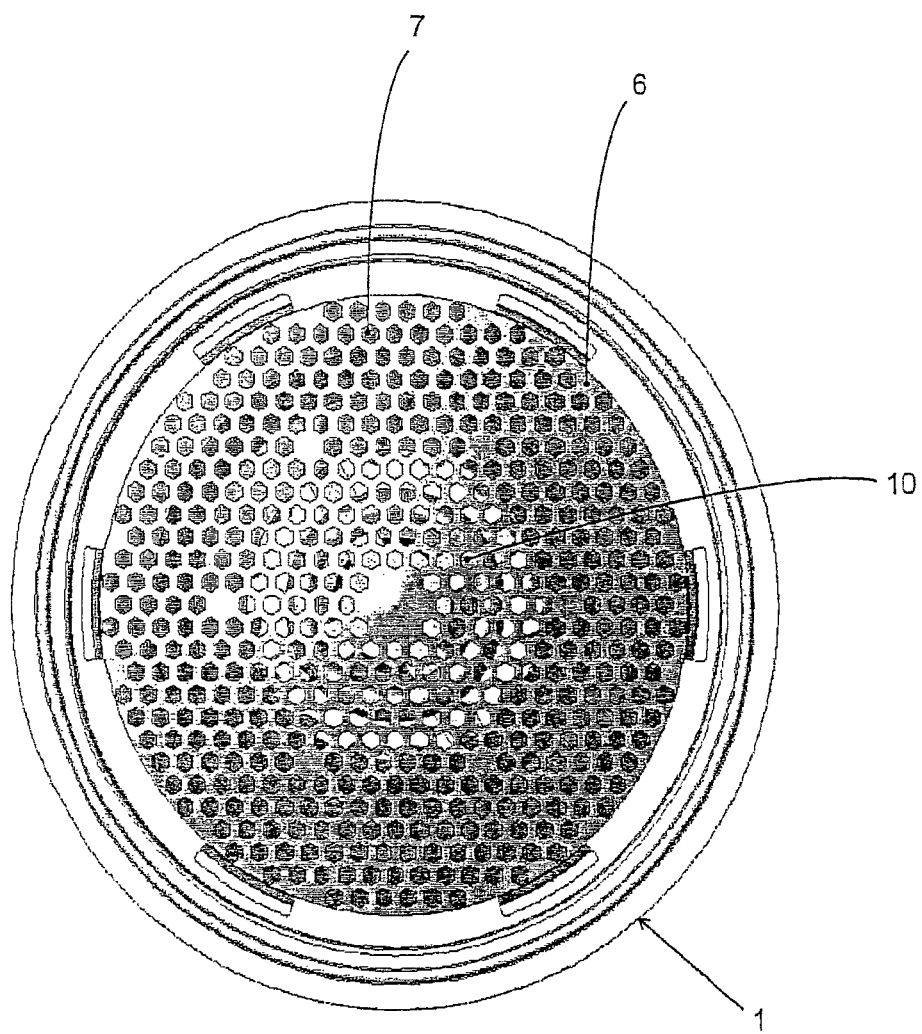
Figure 3:
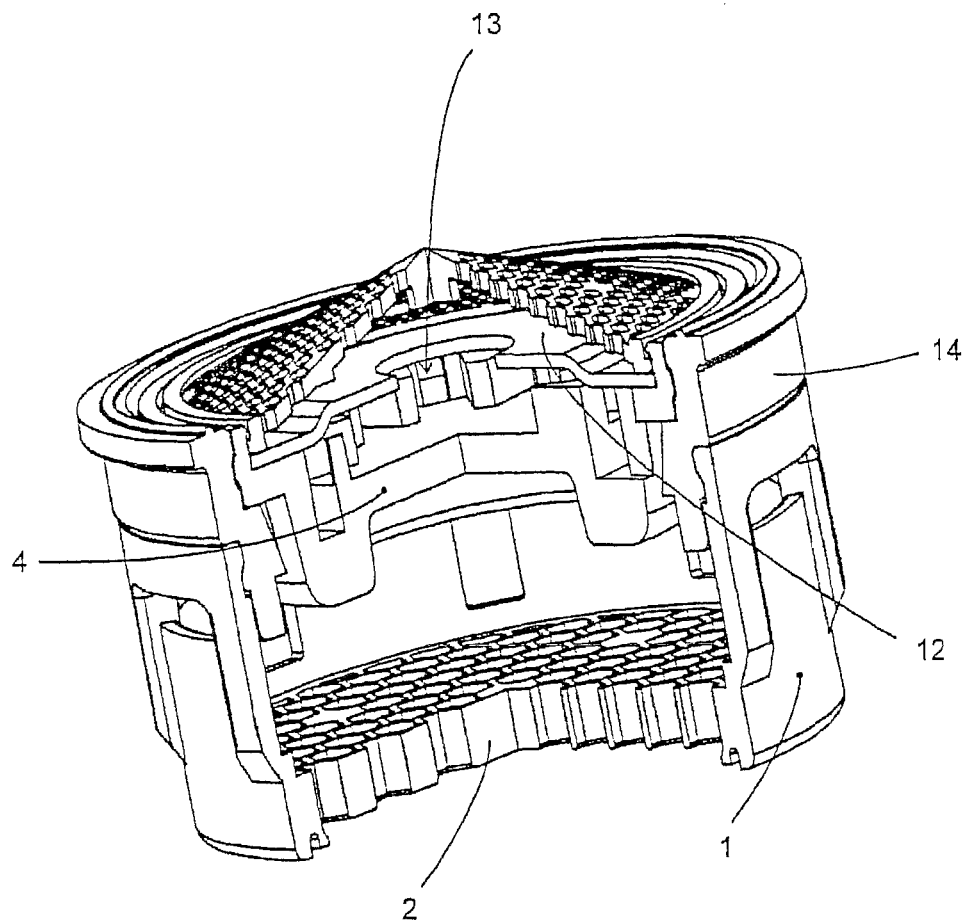
Figure 4:
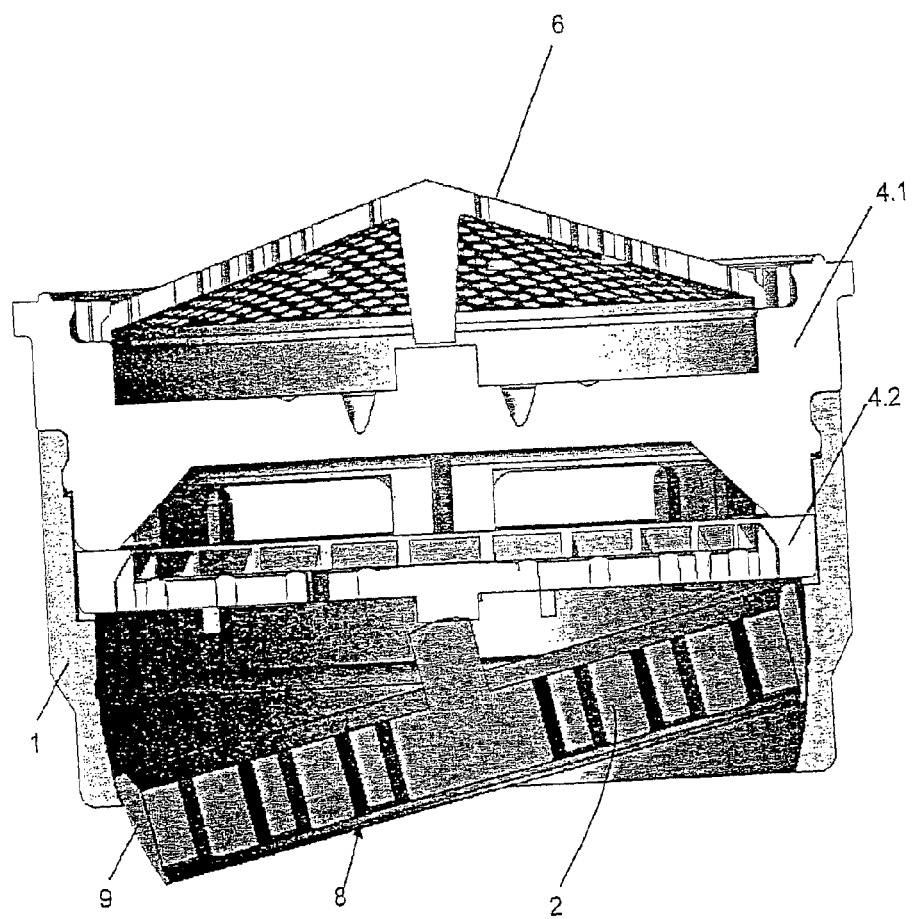
Figure 5:
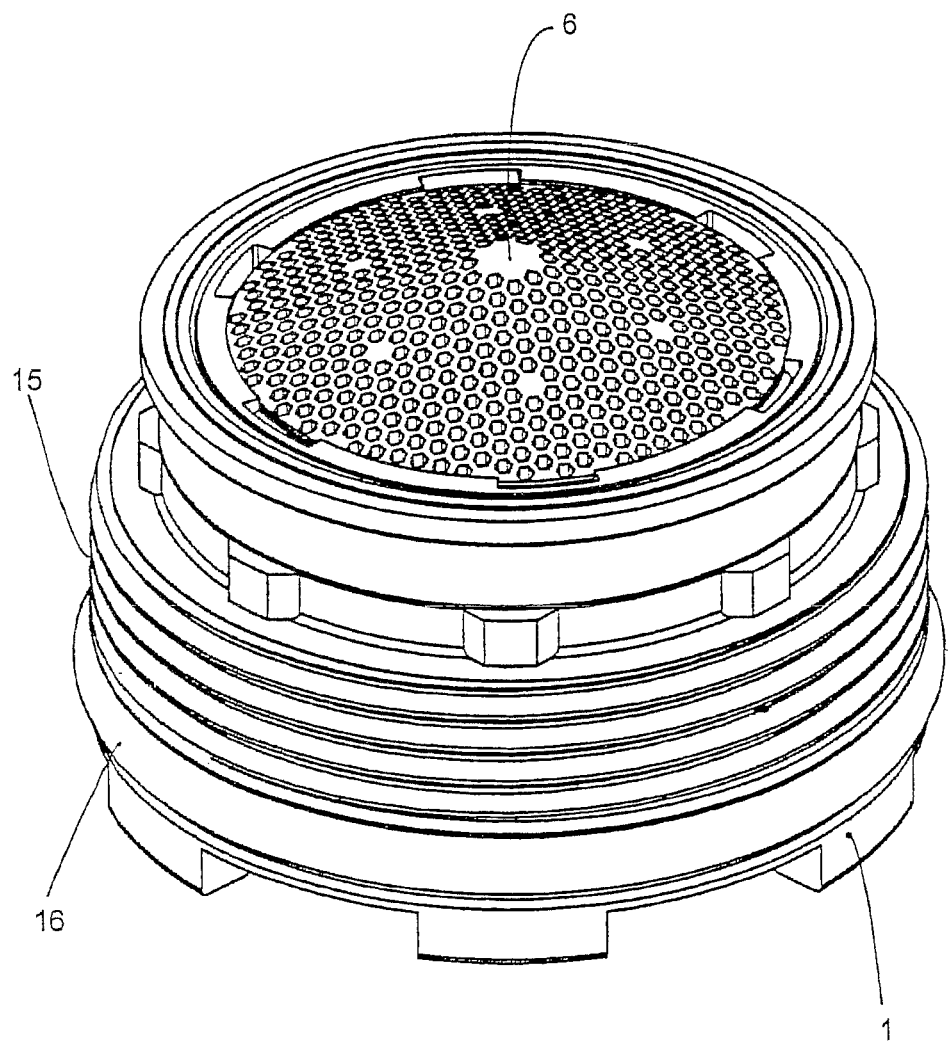

Shown are:

FIG. 1 a sanitary component in the form of a stream former having a shell body for producing an aerated stream;

FIG. 1a a partial sectional view of FIG. 1;

FIG. 2 a top plan view of a sanitary component in the form of a stream regulator comprising a transparent screen attachment and an identifiable regulating unit;

FIG. 2a a partial sectional view of FIG. 2;

FIG. 3 a partial section of a sanitary component comprising a two-piece diffuser plate assembly;

FIG. 4 a sectional view through an embodiment of a stream regulator having a pivotable flow straightener within the shell body;

FIG. 5 a perspective top plan view of a stream regulator comprising a male thread for concealed fitting inside an outflow faucet;

FIG. 6 an example of selected coding for the screen attachment and the diffuser plate assembly with flow rates typical for the respective color combination at the respective pressure values;

FIG. 7 a synopsis of the color codes for the flow regulator having a transparent screen attachment for performing the function of regulating flow;

FIG. 8 a depiction of the color codes for the shell, the shell body respectively, for the function of obtaining an aerated or laminar stream;

FIGS. 9 and 10 an example of the colors for the screen attachment based on the European versus the USA sales territory in terms of the specific preferred application of the sanitary components;

FIG. 11 an externally-identifiable color coding for the diffuser ring as part of the diffuser plate assembly in terms of the noise properties of the sanitary component;

FIG. 12 a depiction of the haptic codes respective the lime-resistant function, and FIG. 13 the color codes for the shell body, the shell base respectively, in terms of the desired stream direction when using the sanitary component.

In accordance with FIGS. 2 and 2a, the sanitary component comprises a flow-regulated stream regulator (FIG. 2a) having property-defining components arranged in sandwich-like manner in the direction of flow. FIGS. 1 and 1a show a sanitary component having a stream regulator which only forms or straightens the stream.

The most essential element of the sanitary components according to the invention is the shell body 1 provided with flow-straightening, stream-forming means 2 (flow straightener) comprising openings at its underside or lower section.

The shell body 1 has slot-like openings 3 across certain sections of its outer circumference which serve in the supply of ambient air; namely when an aerated, bubbly stream pattern is to be produced.

A circular diffuser plate assembly 4 is disposed upside the shell body 1 in the inflow direction. This diffuser plate assembly 4 exhibits a plurality of special, flow-dividing openings of different cross-sections or varying longitudinal cuts so as to accelerate the inflowing fluid and pass it through to the flow straightener 2 arranged downstream in the direction of flow.

The diffuser plate assembly 4 is brought into contact with the interior of the shell body 1, e.g. by means of a locking connection 5, and is fixed accordingly.

Thus, to realize an adaptability to different user and use requirements, the property-defining components, namely the diffuser plate assembly 4 and the shell body 1, are exchangeable and combinable with the stream-forming means 2. To this end, locking means are disposed, preferably integrated, on the inner circumference of the shell body 1, while the corresponding counter-locking means are arranged, preferably integrated, on the outer circumference of the circular diffuser plate assembly 4.

The circular diffuser plate assembly 4 is coded at least on its outer side. The shell body 1 is likewise coded at least on its outer side, whereby both the circular diffuser plate assembly 4 as well as the shell body 1 are preferably made of a solid-colored synthetic material, whereby the synthetic material's color corresponds to the desired optical coding.

A screen attachment 6 is also inserted into the diffuser plate assembly 4, preferably by means of a locking connection 5.1 or by flush-fitting. For this purpose, one embodiment provides for the circular diffuser plate assembly 4 to comprise an inner recess and the screen attachment 6 a partial or full collar complementary thereto.

In the case of a flow regulator 7 inserted between the screen attachment 6 and the diffuser plate assembly 4 (see FIGS. 2 and 2a), the screen attachment 6 is of a transparent design pursuant this embodiment (see FIG. 2) and the flow regulator 7 has another optical coding which differs from that of the given diffuser plate assembly 4.

In the case of there being no flow regulator 7 (FIGS. 1 and 1a), the optical coding of the screen attachment 6 is designed to match that of the diffuser plate assembly 4 or is provided in a predefined combination, in particular a color combination in accordance with Table 1 (FIG. 6 of the drawings).

A consideration of Tables 1 to 3 (FIGS. 6-8 of the drawings) and the embodiment of the sanitary components according to FIGS. 1a, 2a and 3 allows for readily deriving both the scope of application as well as the product specification or parameters.

The product pursuant FIG. 1 or 1a is accordingly a stream regulator having a shell body 1 and slot-shaped openings 3 which, pursuant Table 3 (FIG. 8 of the drawings), is of a dark gray color. A dark gray shell body 1 here signifies that the product produces an aerated stream.

The combination of dark blue diffuser plate assembly 4 and dark blue screen attachment 6 results in a stream regulator suitable for flow rate class B (see Table 1, shown in FIG. 6 of the drawings).

The sanitary component according to FIGS. 2 and 2a relates to a flow-regulated stream regulator, namely for the reason that its screen attachment 6 is transparent. The flow regulator 7 visible through transparent screen 6 is yellow, meaning a flow rate of a maximum 8.3 l/min at its intended use and pursuant the impending, also variable, pressure.

The elastically deformable ring 10 disposed in a control gap 11 is also visible. In the unloaded state, this ring 10 cannot be deformed and must assume a target position with respect to the flow cross-section to be altered. The corresponding position of the deformable ring 10 can be readily deduced with the transparent screen attachment 6 as employed.

With reference to FIG. 2a and a consideration of Table 3 (FIG. 8 of the drawings), the shell body 1 shown therein likewise has a dark gray color, signifying that the stream produced in this case is also aerated.

Should the shell body 1 have a light gray color, that would signify that a laminar stream would be produced in accordance with the intended use of the respective stream regulator.

The sanitary component of FIG. 3 with its multi-member diffuser plate assembly comprises a screen 12 with a through-flow opening 13. This through-flow opening, the flow rate class-defining dimension of which is not readily visible to the user, can be symbolized by the coloring to the ring member 14 and/or the coloring to the screen attachment 6. The ring member 14 can be configured as an integral part of the diffuser plate assembly.

The embodiment of the stream regulator according to FIG. 4 has essentially the same basic construction as that shown in FIGS. 1 and 2, respectively 1a and 2a.

The diffuser plate assembly is disposed in the interior of shell body 1 and has an upper part 4.1 for the purpose of accelerating the stream and a lower part 4.2 for dividing and decelerating the accelerated stream. The flow straightener 2 is disposed underneath the diffuser plate assembly as pivotable element 8. In order to obtain the pivoting motion shown as an example in FIG. 4, the lower section of the inner circumference of shell body 1 is configured in spherical cap shape. The outer circumference of pivotable element 8 has the correspondingly complementary spherical cap shape 9. Because it is possible to pivot element 8, the outflowing stream can be moved back and forth at a specific angle, yielding substantial applicational advantages for a water faucet fitted with same.

The color coding of the pivotable element 8 as the base of the shell body can be designed to differ in color from the shell body 1 so as to likewise enable a clear correlation in the sense of the invention, e.g. the color according to Table 8 (FIG. 13 of the drawings).

Providing an additional haptic coding to the outer surface of the flow straightener or the shell base allows for the defining of the sanitary components' resistance to lime deposits pursuant Table 7 (FIG. 12 of the drawings). The choice of color to the non-transparent screen attachment moreover offers the user of the sanitary component a clear indication of its preferred use, e.g. conserving water. For example, according to the present Tables 4 and 5 (FIGS. 9 and 10 of the drawings), the color "green" signifies water economizing based on a reduced flow rate.

It is to be noted at this point that all the afore-mentioned optical codings are predefined irrespective of the given diameters or dimensions to the sanitary components. The optical codings relate only to the stream regulator's function-defining or comfort-defining properties.

FIG. 5 shows a sanitary component, the shell body 1 of which comprises a male thread 15 so that it can be screwed directly into a complementary female thread of an outflow faucet. The codings as described above can also be used here as well for flow rate classes and/or flow regulation. There is also the additional possibility of defining the type and/or pitch to the male thread 15 by the color code of the requisite washer 16.

LIST OF REFERENCE NUMERALS 1 shell body
2 stream-forming means in the cross-sectional area of shell body 1
3 slot-shaped air supply openings in the shell body 1
4 flow rate class-defining diffuser plate assembly
5 locking connection between shell body 1 and diffuser plate assembly 4
6 screen attachment
7 flow regulator
8 pivotable flow straightener
9 spherical cap
10 elastic ring
11 control gap
12 screen
13 through-flow opening
14 ring member
15 male thread
16 washer

The invention claimed is:

1. A sanitary component for flowing fluid media, the fluid media having a direction of flow, the sanitary component having property-defining components, the property-defining components being situated in a sandwich arrangement, the property-defining components including at least a screen attachment, a diffuser plate assembly and a shell body, the shell body having a cross-sectional surface and segments of stream-forming openings extending across the cross-sectional surface, the sanitary component comprising:
cooperating first and second fixing means for at least one of exchanging and combining said property-defining components, the first fixing means being at least one of integrally formed on the shell body and molded in the shell body, and the second fixing means being at least one of integrally formed on the diffuser plate assembly and molded in the diffuser plate assembly;
wherein the diffuser plate assembly has an exterior surface and includes at least on the exterior surface thereof a flow rate class-specifying optical code;
wherein the flow rate class-specifying optical code of the diffuser plate assembly includes a color;
wherein the screen attachment is connected to the diffuser plate assembly;
wherein the property-defining components further include a flow regulator, the flow regulator being disposed between the screen attachment and the diffuser plate assembly, the flow regulator defining a control gap;
wherein the sanitary component further comprises an elastically deformable ring, the elastically deformable ring being disposed within the control gap, the flow of fluid media through the sanitary component being altered by the elastically deformable ring under the pressure of the flowing fluid media;
wherein the screen attachment is one of transparent and translucent such that at least one of the flow regulator and the position of the deformable ring is identifiable;
and wherein the shell body includes one of a stream flow-specifying laminar optical code and a stream flow-specifying aerated optical code.

2. The sanitary component according to claim 1, wherein the shell body includes a circumference and a plurality of air supply slots formed in the circumference thereof, and wherein the at least one of the stream flow-specifying laminar optical code and the stream flow-specifying aerated optical code of the shell body includes the stream flow-specifying aerated optical code, the stream flow-specifying aerated optical code having a particular color which indicates a presence of the plurality of air supply slots in the shell body.

3. The sanitary component according to claim 1, wherein the at least one of the stream flow-specifying laminar optical code and the stream flow-specifying aerated optical code of the shell body includes the stream flow-specifying laminar optical code, the stream flow-specifying laminar optical code having a particular color which indicates that the shell body does not include air supply slots.

4. The sanitary component according to claim 1, wherein the elastically deformable ring has a visually identifiable coding.

5. The sanitary component according to claim 1, wherein the screen attachment exhibits one of a convex shape and a conical shape.

6. The sanitary component according to claim 5, wherein the diffuser plate assembly is circular, and wherein the screen attachment has formed therein polygonal screen openings and has an annular collar, the annular collar engaging the circular diffuser plate assembly to secure the screen attachment to the diffuser plate assembly.

7. The sanitary component according to claim 1, wherein each of the screen attachment, the diffuser plate assembly and the shell body exhibits a circular cross-section.

8. The sanitary component according to claim 1, wherein the shell body includes an exterior surface and a male thread formed on the exterior surface thereof, the male thread having a thread form and a thread pitch associated therewith;
and wherein the shell body further includes a washer having a color code, the color code of the washer defining at least one of the thread form and the thread pitch associated with the male thread of the shell body.

9. A method for manufacturing a sanitary component, which comprises the steps of:
obtaining customer-specific requirements of the sanitary component of claim 1 from a customer, the customer-specific requirements including at least one of a desired flow rate class, a stream pattern and a flow rate, each of the property-defining components of the sanitary component having associated therewith an optical code;
comparing the customer-specific requirements to a code table having a list of the optical codes of the property-defining components of the sanitary component to identify the property-defining components to assemble to manufacture the sanitary component, thereby obtaining identified property-defining components;
retrieving the identified property-defining components from an inventory; and
assembling the identified property-defining components to form the sanitary component.

10. The method according to claim 9, wherein the optical codes of the property-defining components include predefined colors of differing color temperatures;
and wherein at least one of the steps of retrieving the property-defining components from the inventory and assembling the property-defining components to form the sanitary component includes the use of image acquisition and computer-aided image processing.

11. A use of a sanitary component comprising the steps of: obtaining a sanitary component manufactured in accordance with the method defined by claim 10; and attaching the sanitary component to a flowing fluid media outlet.

12. The use of a sanitary component according to claim 11, wherein the optical codes of the property-defining components include colors of different color temperatures.

13. A sanitary component for flowing fluid media, the fluid media having a direction of flow, the sanitary component having property-defining components, the property-defining components being situated in a sandwich arrangement, the property-defining components including at least a screen attachment, a diffuser plate assembly and a shell body, the shell body having a cross-sectional surface and segments of stream-forming openings extending across the cross-sectional surface, the sanitary component comprising:
cooperating first and second fixing means for at least one of exchanging and combining said property-defining components, the first fixing means being at least one of integrally formed on the shell body and molded in the shell body, and the second fixing means being at least one of integrally formed on the diffuser plate assembly and molded in the diffuser plate assembly;
wherein the diffuser plate assembly has an exterior surface and includes at least on the exterior surface thereof a flow rate class-specifying optical code;
wherein the flow rate class-specifying optical code of the diffuser plate assembly includes a color;
wherein the screen attachment is connected to the diffuser plate assembly;
wherein the property-defining components further include a flow regulator, the flow regulator being disposed between the screen attachment and the diffuser plate assembly, the flow regulator defining a control gap;
wherein the sanitary component further comprises an elastically deformable ring, the elastically deformable ring being disposed within the control gap, the flow of fluid media through the sanitary component being altered by the elastically deformable ring under the pressure of the flowing fluid media;
wherein the screen attachment is one of transparent and translucent such that at least one of the flow regulator and the position of the deformable ring is identifiable;
and wherein the flow regulator includes an optical code.

14. A sanitary component for flowing fluid media, the fluid media having a direction of flow, the sanitary component having property-defining components, the property-defining components being situated in a sandwich arrangement, the property-defining components including at least a screen attachment, a diffuser plate assembly and a shell body, the shell body having a cross-sectional surface and segments of stream-forming openings extending across the cross-sectional surface, the sanitary component comprising:
cooperating first and second fixing means for at least one of exchanging and combining said property-defining components, the first fixing means being at least one of integrally formed on the shell body and molded in the shell body, and the second fixing means being at least one of integrally formed on the diffuser plate assembly and molded in the diffuser plate assembly;
wherein the diffuser plate assembly has an exterior surface and includes at least on the exterior surface thereof a flow rate class-specifying optical code;
wherein the flow rate class-specifying optical code of the diffuser plate assembly includes a color;
wherein the screen attachment is connected to the diffuser plate assembly;
wherein the property-defining components further include a flow regulator, the flow regulator being disposed between the screen attachment and the diffuser plate assembly, the flow regulator defining a control gap;
wherein the sanitary component further comprises an elastically deformable ring, the elastically deformable ring being disposed within the control gap, the flow of fluid media through the sanitary component being altered by the elastically deformable ring under the pressure of the flowing fluid media;
wherein the screen attachment is one of transparent and translucent such that at least one of the flow regulator and the position of the deformable ring is identifiable;
and wherein the shell body includes a shell base, the shell base acting as a flow straightener for the flowing fluid media, and wherein said shell base exhibits a color code.

15. The sanitary component according to claim 14, wherein the shell base is pivotable.

16. The sanitary component according to claim 14, wherein the shell body includes an exterior surface, and wherein at least one of the shell base and the exterior surface of the shell body includes a coating of an elastomer material.

17. The sanitary component according to claim 16, wherein the coating includes at least one of a color and a color code.

18. The sanitary component according to claim 16, wherein the coating of the elastomer material has properties which provide a haptic coding.

* * * * *